(12) United States Patent
Dougherty et al.

(10) Patent No.: US 6,725,461 B1
(45) Date of Patent: Apr. 20, 2004

(54) REMINDER SYSTEM FOR BROADCAST AND NON-BROADCAST EVENTS BASED ON BROADCAST INTERACTIVE APPLICATIONS

(75) Inventors: Brian P. Dougherty, Lafayette, CA (US); Allan C. Thygesen, Menlo Park, CA (US); Michael Capuano, Menlo Park, CA (US)

(73) Assignee: Wink Communications, Inc., Alameda, CA (US)

( * ) Notice: Subject to any disclaimer, the term of this patent is extended or adjusted under 35 U.S.C. 154(b) by 478 days.

(21) Appl. No.: 09/071,373

(22) Filed: Apr. 30, 1998

(51) Int. Cl.[7] .................................................. G06F 3/00
(52) U.S. Cl. ................................ 725/40; 725/46
(58) Field of Search ....................... 345/327; 348/906, 348/563, 564, 473, 7; 725/58, 39–57

(56) References Cited

U.S. PATENT DOCUMENTS

| | | | |
|---|---|---|---|
| 4,115,846 A | | 9/1978 | Laine .......................... 364/200 |
| 4,700,386 A | | 10/1987 | Kohn ........................... 380/10 |
| 5,165,012 A | | 11/1992 | Crandall et al. ............. 395/100 |
| 5,179,439 A | | 1/1993 | Hashimoto .................... 358/86 |
| 5,353,121 A | | 10/1994 | Young et al. ................ 348/563 |
| 5,583,560 A | * | 12/1996 | Florin et al. .................. 725/40 |
| 5,585,866 A | * | 12/1996 | Miller et al. ................ 348/906 |
| 5,589,892 A | * | 12/1996 | Knee et al. .................... 725/43 |
| 5,594,509 A | * | 1/1997 | Florin et al. .................. 725/43 |
| 5,689,799 A | * | 11/1997 | Dougherty et al. ......... 455/2.01 |
| 5,699,107 A | | 12/1997 | Lawler et al. ................ 348/13 |
| 5,734,853 A | | 3/1998 | Hendricks et al. .......... 395/352 |
| 5,848,352 A | * | 12/1998 | Dougherty et al. .......... 725/110 |
| 5,907,322 A | * | 5/1999 | Kelly et al. ................... 725/51 |

FOREIGN PATENT DOCUMENTS

| | | | |
|---|---|---|---|
| EP | 0 742 669 A1 | 5/1996 | .......... H04N/7/088 |
| WO | WO 98 27723 A | 6/1998 | .......... H04N/5/445 |

OTHER PUBLICATIONS

Comshare Commander EIS Brochure, May 23, 1989; Ser. No. 342332.
International Search Report from EP 99108471 dated Dec. 14, 2001.

* cited by examiner

*Primary Examiner*—Chris Kelley
*Assistant Examiner*—Allen Wong
(74) *Attorney, Agent, or Firm*—Fenwick & West LLP (57) ABSTRACT

A system and method provide a generalized reminder system in an interactive broadcast environment, that enables a viewer to quickly establish reminders for both broadcast events and non-broadcast events, and have such reminders displayed at an appropriate future time. The system includes a broadcast that broadcasts programs, such as television programs and commercial advertisements, and interactive applications associated with various such programs. The interactive applications include reminder interactive applications which have reminder data which describe a future time for displaying a reminder and a description of the event for which the reminder is desired. The broadcast programs and reminder interactive applications are received in broadcast receiver which displays the programs. A viewer viewing a program signals the broadcast receiver to establish a reminder for an event related to the program. The broadcast receiver stores the reminder data from the reminder interactive application, and initiates a timer that expires at the desired future time. When the timer expires, the broadcast receiver displays the event description for the reminder. Reminders may be established and displayed for both broadcast events and non-broadcasts events, as the description of the event is contained in the reminder data.

26 Claims, 6 Drawing Sheets

REMINDER SYSTEM FOR BROADCAST AND NON-BROADCAST EVENTS BASED ON BROADCAST INTERACTIVE APPLICATIONS

CROSS REFERENCE TO RELATED APPLICATIONS

The subject matter of this application is related to the subject matter of U.S. Pat. No. 5,689,799, entitled "METHOD AND APPARATUS FOR ROUTING CONFIDENTIAL INFORMATION", which issued on Nov. 18, 1997 and the following applications: application Ser. No. 08/429,064, entitled "METHOD AND APPARATUS FOR DETERMINING BROADCASTER INFORMATION", filed on Apr. 26, 1995, and application Ser. No. 08/429,107, entitled "COMPACT GRAPHICAL INTERACTIVE INFORMATION SYSTEM", filed on Apr. 26, 1995. The above patent and applications have the same assignee as the present invention and are incorporated herein by reference in their entirety.

BACKGROUND

1. Field of Invention

The present invention relates generally to interactive broadcast systems, and more particularly to apparatuses and methods for establishing and communicating reminders to a viewer about broadcast and non-broadcast events.

2. Background of the Invention

Interactive broadcast systems, such as interactive television, provide the viewer with an enhanced viewing experience, typically allowing the viewer to engage with interactivity associated with individual televisions programs or advertising content. The interactivity is typically provided to the viewer's broadcast receiver (e.g. television receiver, or set top box) by broadcast from a central host, such as a cable head-end. Viewer responses are communicated back from the broadcast receiver to the cable head-end by a back channel communication link, such as telephone connection. In this fashion the cable head-end can broadcast content particular to a viewer's responses. However, in this approach all interactivity is controlled and produced at the cable head-end, and the broadcast receiver is generally used merely for display of the interactivity and receipt of viewer inputs.

With the vast array of broadcast offerings, viewers may like to have a means for reminding them in the future to watch a particular broadcast event, such as a television show or movie. It is desirable that a viewer can easily, and on impulse, establish such a reminder, without cumbersome or mode-based programming. In addition, advertisements often broadcast information about non-broadcast events, such as upcoming sales at department stores, limited time offers to purchase items on a shopping channel, and limited time offers to subscribe to premium channel services being offered on a channel other than the one being watched by the viewer.

Some interactive cable systems provide limited means for establishing reminders. For example, Lawler, et al., U.S. Pat. No. 5,699,107 discloses an on-screen program selection guide that displays information about future broadcast programs, and with which the viewer can program reminder data to view a certain future broadcast at a certain time. This reminder data is transmitted from the broadcast receiver to the cable head-end where it is stored and monitored. At the designated time, the cable head-end transmits a message to the viewer's broadcast receiver with the reminder to view the broadcast. However, because this system is based on selection of broadcast items from a program selection guide, it cannot be used to establish reminders for non-broadcast related events. Further, this method requires the viewer to actuate the program guide, review it for a desired program, and set the reminder. Because the viewer must use the program guide in this manner for any reminder, this approach thus does not allow the viewer to immediately establish a reminder at any time based on the broadcast program she is currently viewing, without having to activate a separate programming guide. For example, if the viewer sees an advertisement for a television program that is to be broadcast the following week, she must activate the program guide, search through it for the listing of the desired program in the desired time slot next week, and select this program to establish the reminder data. This process interferes with the viewer's viewing of what was being broadcast. Indeed, if the adverstisement ends before the viewer is done with programming the reminder data, she may miss a portion of a television program that she was watching. Finally, this type of system stores the reminder data at the cable head-end, and makes the cable head-end responsible for managing the reminder data of hundreds, perhaps thousands of viewers. This approach is highly inefficient but results from the inability of conventional broadcast receivers to store and actively monitor reminder data.

SUMMARY OF THE INVENTION

The present invention overcomes the limitations of conventional systems by providing a generalized system and method that allows for the establishment and communication of reminders for both broadcast and non-broadcast events. The present invention further enables the viewer to immediately establish a reminder based on a currently viewed broadcast item, without having to traverse through complex program guides. Further, the viewer can establish reminders that relate to either future broadcast events, or to future non-broadcast events. For example, with the present invention, when viewing an advertisement for a sale at a department store that begins in three days, the viewer can set a reminder for that sale; the reminder that the sale has started is displayed to the viewer when the viewer uses their television in three days' time. The reminder data is preferably stored locally at the viewer's broadcast receiver, thereby eliminating the burden on the broadcaster or cable head-end to manage reminders for potentially tens of thousands of viewers.

A system in accordance with the present invention includes a broadcast system that broadcasts interactive applications in association with broadcast programs, including television programs and commercial advertisements. The interactive applications include reminder interactive applications for establishing reminders about broadcast events, such as upcoming television programs, and non-broadcast events, such as a retail sales event, related to broadcast program, such as a commercial advertisement for the retail sales event. The system includes a broadcast receiver that receives the broadcast programs and the associated interactive applications, displays the broadcast programs, and executes the associated reminder interactive application. When a viewer is viewing a broadcast program, she may instruct the broadcast receiver to establish reminder data related to the broadcast event, or a non-broadcast event associated with the broadcast event. Execution of the reminder application receives the reminder data and stores it in the memory, and initiates a timer based upon the reminder data to countdown the time remaining for the reminder data. The broadcast receiver may store multiple different timers for different reminders. The reminder data is preferably defined within the reminder interactive application, so that the user has to program as little data as possible. For example, the reminder interactive application may include the date, time, and description of the event for which the reminder is desired. In this fashion the user need only to activate the reminder interactive application when viewing the broadcast program, and need not select a specific program in a complex program guide to set the reminder data.

During subsequent viewing, when a timer expires, the broadcast receiver displays a reminder display on a display such as the viewer's television, providing descriptive information of the reminder, such as the date, time, and description of the broadcast or non-broadcast event.

A method in accordance with the present invention includes receiving broadcast data including at least one broadcast program and a reminder interactive application associated with the broadcast program, receiving a user input to establish a reminder for an event associated with the broadcast program, executing the reminder interactive application to establish reminder data for the event in a broadcast receiver, establishing in the broadcast receiver a timer based upon the reminder data, and providing a display of the reminder from the reminder data upon expiration of the timer.

DETAILED DESCRIPTION OF THE PREFERRED EMBODIMENT

Figure 1:
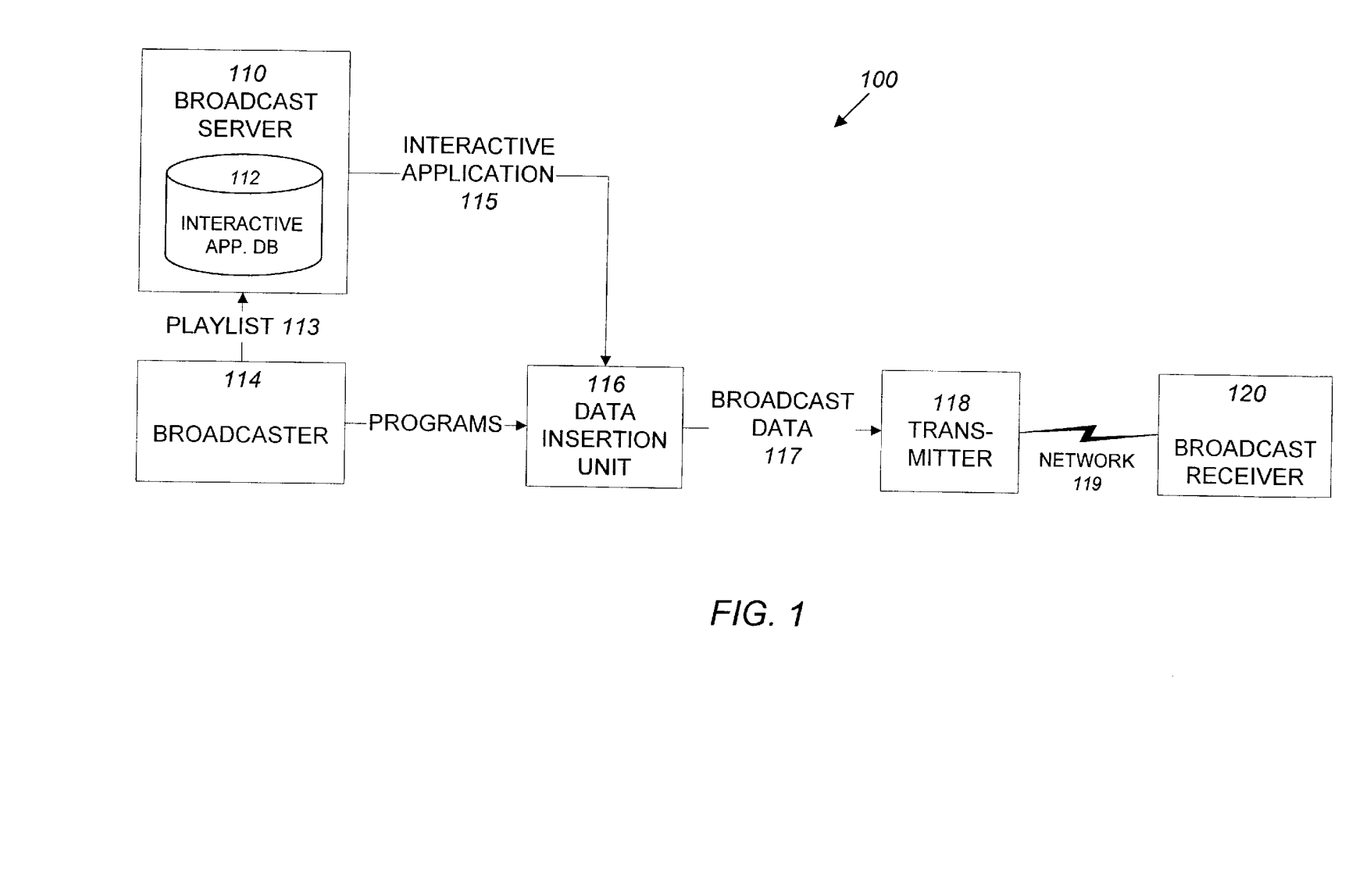
FIG. 1 is an illustration of a system in accordance with the present invention.

Referring now to FIG. 1, there is shown an illustration of a system in accordance with the present invention. It will be appreciated that the system illustrated in FIG. 1 may be incorporated in to larger, more complex systems while still providing the features and benefits of the invention. Generally, system 100 includes a broadcaster 114, a broadcast server 110, a data insertion unit 116, and at least one broadcast receiver ("BR") 120.

BROADCASTER

The broadcaster 114 provides program material to be broadcast to the BRs 120. As used herein, a "broadcaster" 114 is any entity providing a program that will be carried on a broadcast signal. A "program" is a discrete segment of a broadcast. Thus, as defined herein, programs include television shows, commercials, public service announcements, pay-per-view events, and the like. Broadcasters include television networks, as well as advertisers who prepare commercials, pay-per-view providers, cable networks, and the like. A typical broadcaster 114 maintains program sources, such as banks of video cassette players, video disc players, film, and the like containing program material; automation systems that selectively control the programs sources to select which units provide program material at which times; and switching systems controlled by the automation systems which couple the program sources to respective broadcast media for controlling which program sources output to which broadcast mediums at any given time. The person or persons receiving the programs are referred to as "subscribers" or "viewers."

Generally, a broadcaster 114 will broadcast programs associated with broadcast events, or non-broadcast events. Programs associated with broadcast events include advertisements for future television programs, movies, pay-per-view events, specials, and the like, and programs that are viewed in and of themselves. For example, an episode of a weekly television program is associated by its weekly nature with the following week's episode. Programs associated with non-broadcast events include advertisements for events such as retail events, concerts, meetings, conventions, programs that notify the viewer in advance of the non-broadcast event, and the like. For example, an advertisement for a department store sale would be a program associated with a non-broadcast event.

BROADCAST SERVER

The broadcast server 110 is preferably a computer system executing a software program providing the functionality described herein. The broadcast server 110 contains an interactive application database 112. The interactive application database 112 stores interactive applications that will be broadcast to various remotely distributed BRs 120. Interactive applications may be added to the interactive applications database 112 by a broadcaster 114 or other program supplier and may be transmitted to the database 112 by a secure network link or other transmission media. Fields within the database 112 associate interactive applications with, for example, a particular broadcaster, network, channel, program, and/or broadcast time. In addition, each interactive application in the database 112 preferably has a unique interactive application identification code by which it may be identified.

In one embodiment of the present invention, the interactive applications stored in the database 112 are described by a compact communications protocol. The compact protocol is designed to broadcast a compact set of information and commands among the system components in an efficient manner, thereby allowing the use of low bandwidth transports such as the vertical blanking interval ("VBI"). While a preferred embodiment of the present invention uses the compact protocol described herein, interactive applications may be described by other protocols, including for example, the Hypertext Markup Language ("HTML") or SUN MICROSYSTEMS INC.'s JAVA language. A detailed description of one compact protocol suitable for interactive applications, including supported definitions, scripts, and commands, is described in U.S. Pat. No. 5,689,799, entitled "Method and Apparatus for Routing Confidential Information," which issued on Nov. 18, 1995 and is hereby incorporated by reference herein. The interactive applications are themselves software products comprising executable code and data, which configures and controls the operation of a broadcast receiver 120, as further described below.

In one embodiment, the interactive applications database 112 includes reminder interactive applications which set and establish reminders for broadcast and non-broadcast events. In a preferred embodiment, a reminder interactive application includes forms to confirm or cancel a reminder for a event, forms to display a reminder for an event, scripts to display and manage the forms, and data defining the details of a reminder to be provided to the viewer. The event description contains information useful to both the broadcast receiver 120 to configure itself to establish and manage the reminder if so requested by the viewer, and information useful to the viewer to describe the event for which the reminder is established. In a preferred embodiment, the event description includes:

Event name: data providing a name or other identifying information for the viewer to recognize the event. The event name may also include unique identifying data used only by the broadcast receiver 120 to identify the event description.

Event date/time: data defining a date and/or time for a reminder to be displayed.

Event channel: for broadcast events, data defining the network and/or channel on which the broadcast event will occur. This data is useful to allow the broadcast receiver 120 to automatically tune to the specified channel so that the viewer may immediately view the broadcast event.

Reminder data: data defining the time(s) when a reminder is to be displayed to the viewer.

There may be a plurality of broadcast servers 110, with each broadcast server 110 serving a particular geographic area, set of broadcasters, or set of subscribers. In one embodiment, each broadcast server 110 is identified by a unique server identification code.

Generally, the broadcast server 110 determines which interactive applications should be broadcast on a particular channel at a particular time, retrieves the interactive applications corresponding to the particular channel and time from the database 112, and prepares the interactive applications for broadcast.

To determine which interactive applications are broadcast at the various times, channels, and so forth, the broadcast server 110 receives a playlist 113 of programs to be broadcast by the broadcaster 114. In one embodiment, this playlist 113 is prepared in advance and identifies the programs that will be broadcast by the broadcaster 114 at particular times. In another embodiment, the broadcast server 110 receives the playlist 113 in real-time, identifying the program currently being broadcast by the broadcaster 114, with the playlist 113 being updated as the broadcast changes. In either embodiment, the playlist 113 contains sufficient information to identify each program, its start and end times, the channel and network assignments, or broadcaster identification code. The broadcast server 110 uses this information to identify and retrieve a corresponding interactive application from the database 112 that is to accompany the program.

For example, a broadcaster 114 may broadcast advertisement for a future broadcast event such as a special movie presentation. The broadcaster 114 may define a reminder interactive application that is to be broadcast with the advertisement. This reminder interactive application will be stored in the interactive application database 112 with information identifying the advertisement, and if necessary, the broadcaster identification code and broadcast times. When the broadcast server 110 receives a playlist 113 containing identifying information for the advertisement, it retrieves the reminder interactive application, for example by matching the broadcaster identification code, channel assignment for the advertisement, and broadcast times with corresponding information in the interactive application database 112.

The broadcast server 110 formats a retrieved interactive application, if necessary, and otherwise prepares it for insertion into a broadcast signal. Using the playlist 113 received from the broadcaster 114, the broadcast server 110 passes the interactive application 115 to the data insertion unit ("DIU") 116 to incorporate the interactive application 115 into the broadcast data 117 concurrent with the broadcast of the program.

DATA INSERTION UNIT

The DIU 116 receives the interactive application 115 from the broadcast server 110 and the broadcast signal, or feed, carrying the program corresponding to the interactive application 115. The broadcast feed may be received from the broadcaster 114, or, in the case where the broadcaster does not provide the feed, from a third party such as a network, cable operator, or local television station. The DIU 116 converts the interactive application 115 into a format suitable for insertion into the broadcaster feed and transmission therewith as broadcast data 117. The DIU 116 may receive feeds from multiple broadcasters and can insert a separate interactive application into each feed. Likewise, the DIU 116 can simultaneously insert a separate interactive application into multiple channels from the same, or different, broadcasters 114.

The DIU 116 inserts the broadcast data 117 containing the interactive applications and broadcast programs into the broadcast medium. The broadcast medium is the frequency spectrum used to carry the interactive application 115. In one embodiment, the broadcast medium is a standard analog television signal following National Television Standards Committee ("NTSC") standards and the VBI is used as a transport to broadcast the interactive application. The transport is the specific portion of the broadcast medium which carries the interactive application 115. In another embodiment, the broadcast medium is a standard MPEG2 Digital Video Multiplex, containing one or more MPEG2 Video Services, and a MPEG2 elementary stream (or streams) within this multiplex is used as a transport.

In one embodiment, the DIU 116 uses conventional methods to insert data defining an interactive application into the VBI of the broadcast feed. The North American Broadcast Teletext Standard (EIA-506), defines the methods and protocols for sending data in one or more lines of the VBI. However, a wide variety of other transport mechanisms are available, including those that broadcast the interactive application 115 separately from the television program. Such transport mechanisms include out-of-band transmitters, which transmit the interactive application 115 on an unused portion of the television frequency spectrum, and conventional frequency modulation ("FM") radio transmitters, which transmit the interactive application 115 outside the television frequency spectrum. In another embodiment, the DIU uses conventional methods to insert data into an elementary stream within a MPEG2 multiplex.

In one embodiment, error checking or error correcting codes such as Hamming codes are inserted with the data. In one embodiment, the DIU 116 translates the data into a Hamming code, and in another embodiment, the data received by the DIU 116 from the broadcast server 110 is already encoded.

TRANSMITTER

The DIU 116 is coupled to a transmitter 118 for transmitting the broadcast feed, including the inserted interactive application. In one embodiment, the transmitter 118 is a satellite uplink transmitting the feed to local uplink receivers which then distribute the feed to the BRs 120 via cable. In another embodiment, the transmitter 118 is a conventional cable system head-end amplifier. In yet other embodiments, the transmitter 118 is a conventional television broadcast transmitter or a high-definition television digital transmitter.

In another embodiment, the DIU 116 inserts the interactive application 115 into the program before the program is broadcast. For example, the DIU 116 may insert an interactive application into the source copy of a television commercial. Accordingly, the interactive application is broadcast whenever the commercial is broadcast. In this embodiment, the broadcast server 110 does not need to synchronize the retrieval of the interactive application with the schedule listed in the playlist.

Regardless of transmission method and insertion time, the broadcast data 117, including the interactive application, is received by a subscriber's BR 120. Although only a single BR 120 is illustrated in FIG. 1, it is understood that in a typical embodiment there are hundreds or thousands of BRs 120 receiving the broadcast data 117 and responding as described herein. In particular, each broadcast receiver 120 may individually set and establish reminders for broadcast and non-broadcast events as desired by their respective users. In a typical embodiment, the BR 120 is a television set-top box receiving the data 117 via a coaxial cable. Additionally, the BR 120 may be integrated into the television. Moreover, other broadcast receivers, including a NTSC broadcast receiver, a high-definition television digital receiver, a video cassette recorder, or a FM radio receiver can also be used.

BROADCAST RECEIVER

Figure 2:
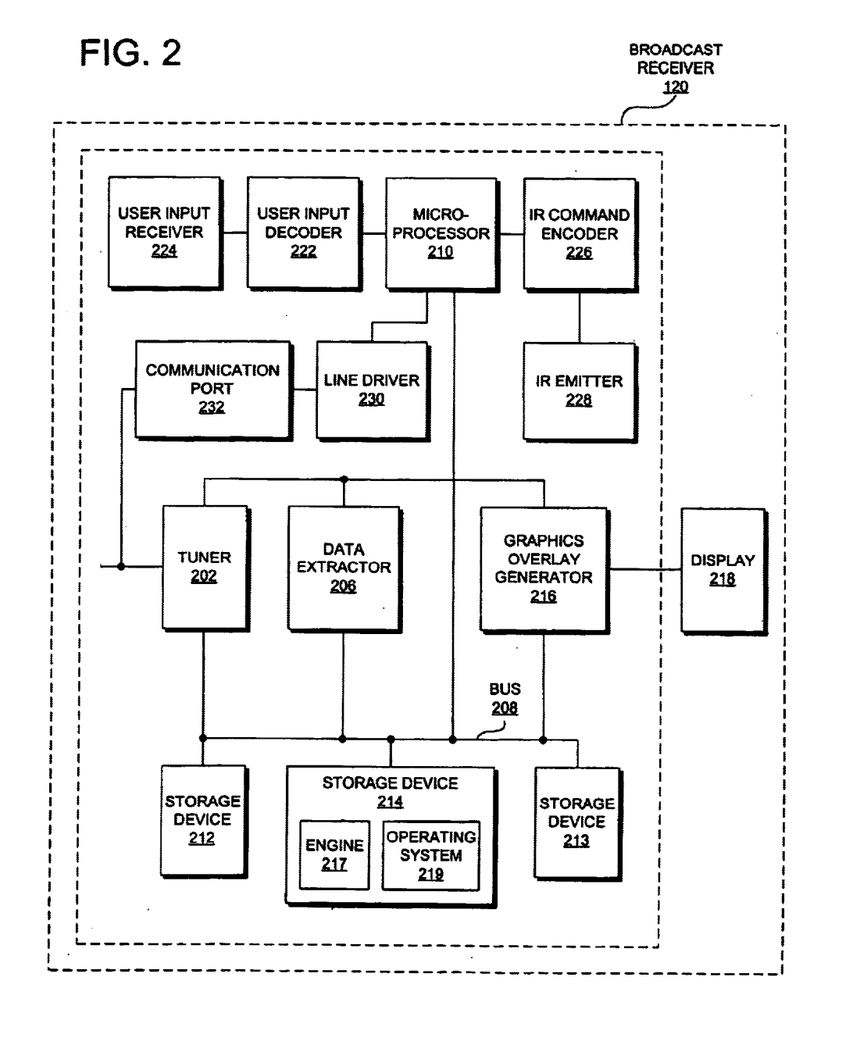
FIG. 2 is an illustration of the broadcast receiver.

FIG. 2 illustrates an embodiment of the BR 120 according to an embodiment of the present invention. In one embodiment, the BR 120 is the General Instrument CFT-2200 CATV set-top decoder. The BR 120 includes a tuner 202 for receiving the broadcast data 117 from the transmitter 118. In one embodiment, the tuner 202 is a conventional cable television tuner. In other embodiments, the tuner is a television broadcast tuner, a FM radio tuner, a digital tuner, or some other form of tuner. The embodiment illustrated in FIG. 2 shows a display 218, typically a television, within the BR 120. As mentioned above, the display 218 may also be located external to the BR 120.

The BR 120 also includes a data extractor 206 coupled to the tuner 202 for extracting the interactive application from the broadcast data 117. In one embodiment, the data extractor 206 is a conventional VBI inband data extraction circuit. In another embodiment, the data extractor 206 is a conventional modem. The data extractor 206 provides a serial bitstream containing the extracted interactive application onto a bus 208.

The bus 208 is coupled to a microprocessor 210 which stores, via the bus 208, the extracted interactive application into a first storage device 212 as instructed by a program stored in a second storage device 214. In one embodiment, the microprocessor 210 uses the error code information from the extracted data to check or correct errors in the decoded interactive application. In one embodiment, the first storage device 212 is a conventional random access memory ("RAM") while the second storage device 214 is a conventional read-only memory ("ROM"). A third storage device 213, which may be RAM or flash memory, is coupled to the microprocessor 210 to store reminder data. An advantage of flash memory is that software or data resident in the BR 120 can be modified by a received interactive application.

In one embodiment, the BR 120 also uses the data extractor 206 to extract a time signal from the broadcast data 117. The time signal indicates the current time using a standard timebase, such as Coordinated Universal Time ("UTC") or the subscriber's local time. In another embodiment, the BR 120 has a real-time clock that is either set by the subscriber or the received time signal. Regardless, the BR 120 preferably has access to the current time and, accordingly, can perform date stamping and timing functions.

As described below, the microprocessor 210 uses the program stored in the second storage device 214 and the interactive application stored in the first storage device 212 to execute the interactive application and provide an output. The program stored in the second storage device 214 is preferably an execution engine 217 for executing an interactive application defined by various scripts, forms, definitions, and code and graphic resources. A preferred execution engine is the Wink Engine provided by Wink Communications, Inc. of Alameda, Calif. The broadcast receiver 120 includes either as part of the execution engine 217, or the native operating system 219 also stored in the second storage device 214, timer functions that can be run as background processes to countdown from an input value, or equivalent timing specification.

The output from executing an interactive application may be, for example, a form presenting information or a menu to a television viewer or for receiving viewer input, or it may be a response, silent or otherwise, containing BR 120 or television usage data or indicating viewer preferences. For purposes of the present invention, the form may be a form to set or cancel a reminder, or to remind the viewer of an upcoming broadcast or non-broadcast event. To this end, the BR 120 preferably includes a graphics overlay generator 216 coupled to the bus 208 and driven by the interactive application 115 stored in the first storage device 212 and the program stored in the second storage device 214. The graphics overlay generator 216 generates a graphical display responsive to the interactive application 115. This graphical display is displayed on a display 218, typically a television, coupled to the BR 120. Of course, the graphics overlay generator 216 is typically not used when an interactive application silently executes.

In one embodiment, the graphics overlay generator 216 also receives the broadcast signal corresponding to a broadcast program from the tuner 202 to allow simultaneous display of the broadcast program and the graphical aspects, if any, of the interactive application 115, for example, to input data into a displayed form to set or cancel a reminder. In one embodiment, the microprocessor 210 is also coupled to a user input decoder 222 coupled to a user input receiver 224 to allow the user to communicate with the microprocessor 210 in order to respond to the interactive application 115. In one embodiment, the user input decoder 222 is a conventional infrared remote control decoder. The user input receiver 224 is preferably a conventional infrared receiver 224 with which the user may use a conventional hand-held remote control device. Remote control keys pressed by the user translate to coded infrared signals that are received by the user input receiver 224, are decoded by the user input decoder 222, and sent to the microprocessor 210 to allow the user to communicate with the interactive application 115.

In one embodiment, the BR 120 is a cable TV set-top decoder, connected to a cable system via a broadband coax cable. In this embodiment, line driver 230 is an RF modem which is capable of sending responses via the coax cable to the cable system head-end, typically using an out-of-band portion of the RF spectrum, and communications port 232 is a standard RF tap. In another embodiment, the BR 120 is a television, VCR, or set-top in which line driver 230 is a standard telephone modem and communications port 232 is a standard RJ-11 jack.

The microprocessor 210 may also be coupled to a conventional infrared command encoder 226, which accepts an infrared command input and encodes a signal for a conventional infrared emitter 228 to allow the interactive application 115 to control external devices.

INTERACTIVE APPLICATION EXECUTION

Figure 3:
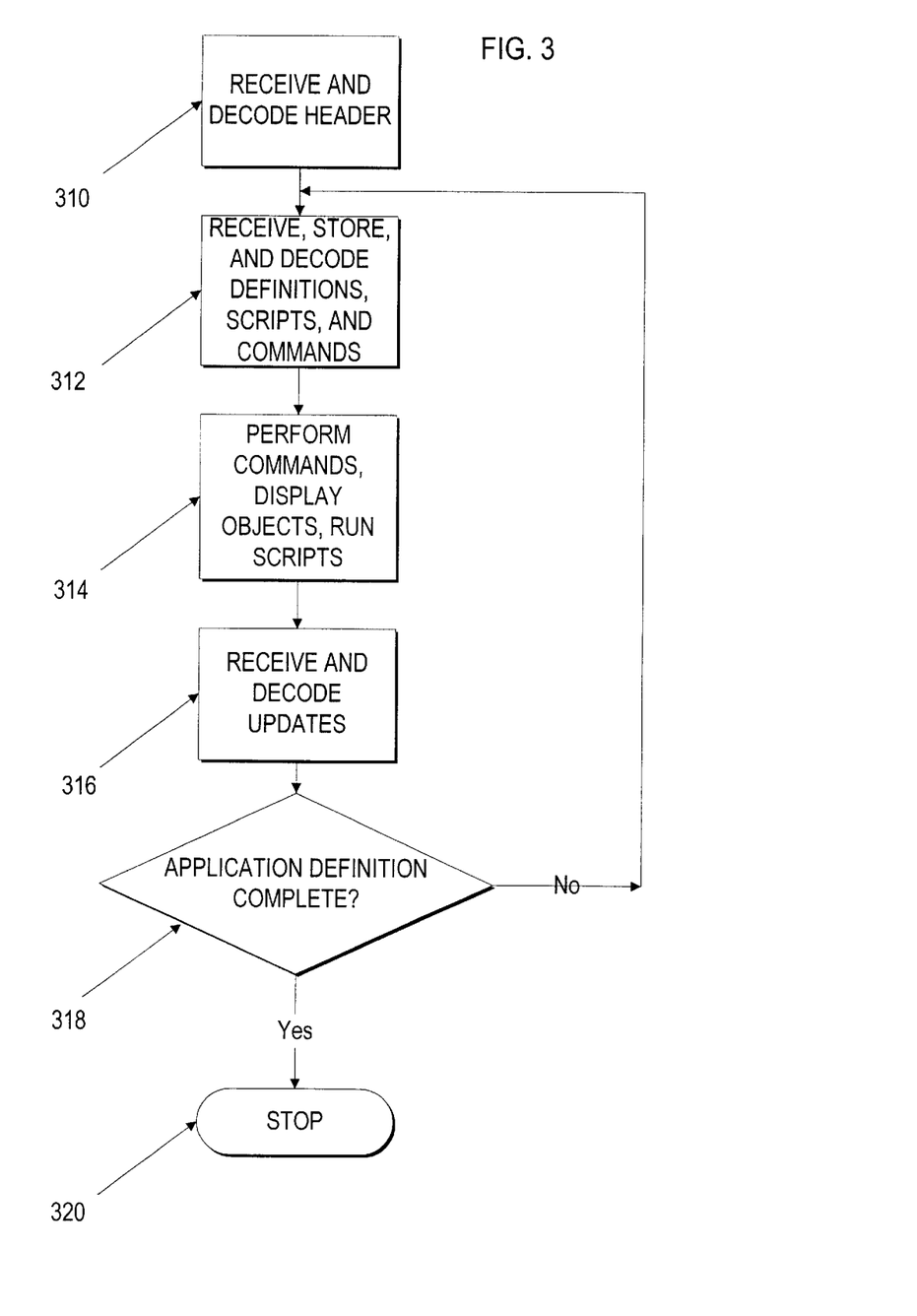
FIG. 3 is a flowchart of a method for executing an interactive application.

FIG. 3 is a flowchart illustrating steps for receiving and executing an interactive application using the compact information protocol according to a preferred embodiment of the present invention. The BR 120 receives and decodes 310 an application header record prepared by the broadcast server 110, inserted by the DIU 116, and transmitted by the transmitter 118. The application header record describes the information that follows and contains the interactive application identification code.

The reminder functionality of the interactive application is described by definitions, scripts, and commands which may be encoded and broadcast in any order. The definitions, scripts, and commands are received and decoded 312 by the BR 120 and define the reminder and response parameters used when executing 314 the reminder interactive application.

Some or all of the received reminder interactive application may be stored 312 within the BR 120. In one embodiment, the interactive application is repeatedly broadcast, allowing a BR 120 to tune to a program at any time yet receive the entire interactive application. Any desired updates to the stored interactive application may be received and decoded 316. If there are additional or updated definitions, scripts, or commands, they may be sent until the application is complete 318. In one embodiment, a termination command may be broadcast to stop 320 the interactive application from reminder.

A new interactive application may be sent at any time, including while an original application is setting a reminder or transmitting a response. For example, a new interactive application corresponding to a commercial may interrupt an original application corresponding to a news program, and the latter application can resume operation upon termination of the former. As part of this functionality, in one embodiment a suspend application command is sent by the new application in order to suspend operation of the original application, and a resume application command may be sent by either application to terminate the new application and resume operation of the original application.

OPERATION OF REMINDER INTERACTIVE APPLICATIONS

A preferred embodiment of the present invention includes a reminder interactive application for execution in the BR 120 that establishes and sets reminders for broadcast and non-broadcast events.

Figure 4:
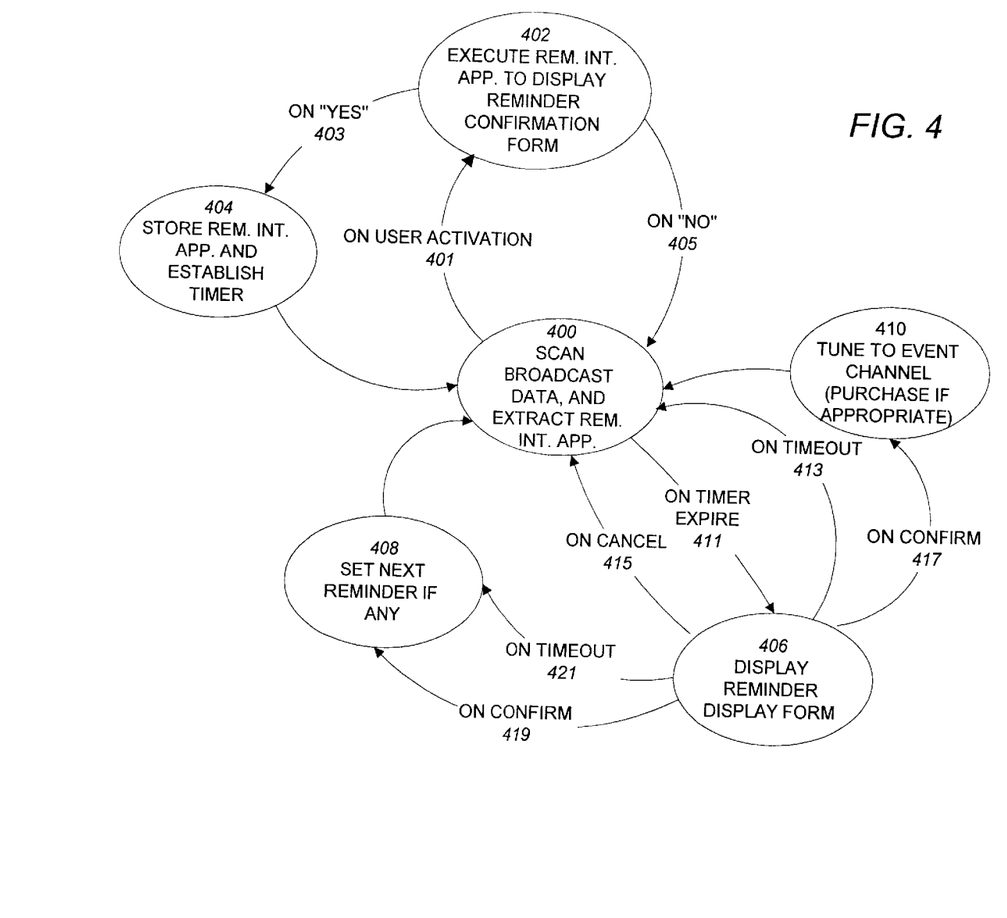
FIG. 4 is a flowchart of a method in accordance with the present invention.

Referring now to FIG. 4, there is shown a state diagram for operating a broadcast receiver 120 in accordance with the present invention to use reminder interactive applications. This behavior is implemented by the execution engine 217 executed by the processor 210. The broadcast receiver 120 is assumed to be tuned to some channel upon which broadcast data is being broadcast. The execution engine 217 continually scans 400 broadcast data received from the transmitter 118, and extracts any reminder interactive application 115 that is included in the broadcast data. These steps are in accordance with steps 310–312 of FIG. 3. The reminder interactive application 115 is stored in the first storage device 212 to allow the execution engine 217 to execute it upon command from the user. The broadcast receiver 120 displays the broadcast program on a display device 218, such as a television screen, for viewing in a normal manner.

Where a reminder interactive application 115 is present, the broadcast program will generally have content that informs the user about some event related to the broadcast program. For example, the broadcast program may be a commercial advertisement for a future broadcast event on the same or other channel, such as a pay-per-view program. Or the broadcast program may be a commercial advertisement for a non-broadcast event, such as a sale at a local retail store, a promotion for a concert, an auction, or any other type of event that occurs independently of the broadcaster broadcasting data about such event.

While the viewer is watching the broadcast program, she may decide to set a reminder to remind her about the event. To do so she activates 401 a button on an input device, such as a remote control unit, which sends a signal to the broadcast receiver 120. The broadcast receiver 120 receives this user input signal via the user input receiver 224 and executes 402 the reminder interactive application 115 stored in storage device 212. In another embodiment, a flashing icon is initially presented on the display 218 to inform the viewer of the presence of an interactive application 115; the viewer can then activate the interactive application 115 as desired.

The reminder interactive application 115 uses its internally defined event description data to create a reminder confirmation form, which it displays to have the viewer confirm that she wants to set a reminder for the event. The display is generated with the graphics overlay generator 216, and output on the display device 218.

Figure 5:
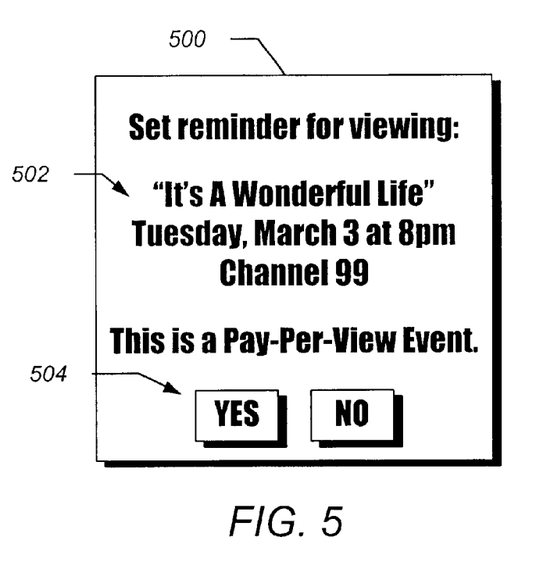
FIG. 5 is an illustration of a user interface for establishing a reminder for an event.

FIG. 5 illustrates a simple reminder confirmation form 500. In this example, the event description 502 included in the reminder interactive application 115 includes the event name "Its A Wonderful Life," a date/time of 8:00 pm on Mar. 3, 1998, and a channel. The user responds to the form 500 by selecting the appropriate key on the user input device, e.g. a "Yes" or "Enter" key to activate a corresponding "Yes" form button 504, or "No" or "Cancel" key to activate the "No" form button 504.

The broadcast receiver 120 receives the user input. If the user input cancels 405 the reminder, then reminder interactive application 115 is exited, and no further action is taken. The broadcast receiver 120 returns to scanning for the next interactive application that is broadcast.

If the user input confirms 403 the reminder, then the broadcast receiver 120 stores 404 reminder data from the reminder interactive application 115 in memory 213, and establishes a timer based on the reminder data. Generally the reminder data includes data for determining a future time for displaying a reminder for the event, and an event description, for example as shown in FIG. 5. The data for determining a future time may be the actual time that the reminder is desired, or an amount of time until the future time, or other variation. In any event, the broadcast receiver 120 establishes a timer that expires at the future time. The future time need not be the actual time at which the event occurs, but is preferably some time before the time of the event to allow the viewer to take whatever actions are desired for viewing or participating in the event. For example, for a broadcast event such as television program about to be aired, the future time may be 1–5 minutes before the event time. For a non-broadcast event, such as a sale at retail establishment, the future time may be several hours, or days before the time of the non-broadcast event.

The present invention also allows for multiple reminders for a given event to be provided to the viewer. This allows the broadcast receiver 120 to notify the viewer several times before the event occurs. For example, for a broadcast event, reminders 1 day, 1 hour, and 1 minute before the broadcast event may be defined in the reminder data, and displayed at the appropriate dates and times. Similarly for a non-broadcast event, reminders 3, 2, and 1 day before the event may be defined in the reminder data.

The timer may be an internal function of the execution engine 217, or it may be part of an underlying operating system that controls the broadcast receiver 120. In either case, the execution engine 217 maintains data which associates each timer with specific reminder data, thereby allowing the execution engine 217 to manage multiple timers for multiple reminders at once. In the first implementation, the execution engine 217 is responsible for managing the timer, and does so by having the timer execute in the background while other functions are being handled, such as executing other interactive applications, displaying program data, receiving user inputs, and so forth. In the latter implementation, the operating system manages the timer, and notifies the execution engine 217 when the timer expires. Either of these or similar implementations may be used, as the specifics of how the timer is implemented is not material to the invention.

After a timer is established 404, it runs until it expires 411. When a timer expires 411 the execution engine 217 obtains from memory 213 the event description associated with the timer in order to create 406 a reminder display form which is used as the reminder to the viewer. This form may be an internally stored reminder display interactive application that displays the event description, or it may be constructed from graphic primitives available to the execution engine 217 and internal engine functions. It should be noted that in most cases the reminder interactive application 115 which was initially used to establish the reminder is no longer present, and not available for execution, and it is for this reason that either the execution engine 217 itself or a resident reminder display interactive application is used to display the reminder display form.

The reminder display form with event description is displayed to the viewer, either for a predetermined amount of time (413), or preferably until the viewer confirms 417 the display or cancels 415. The broadcast receiver 120 receives the viewer's input if any, and proceeds accordingly.

Figure 6:
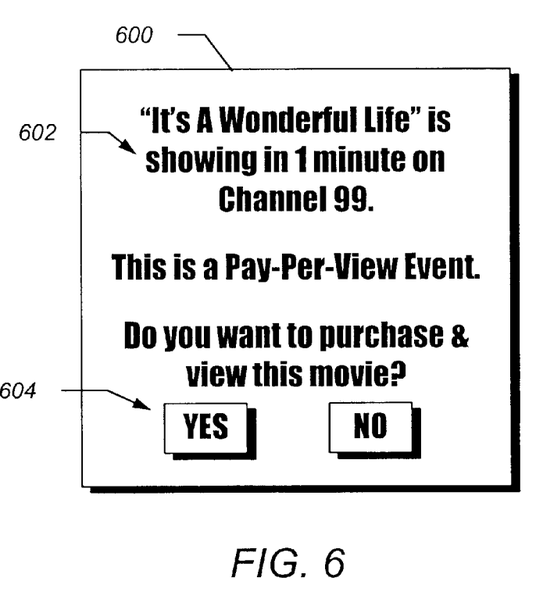
FIG. 6 is an illustration of a reminder display for a broadcast event.

FIG. 6 illustrates an exemplary reminder display form 600 for a broadcast event, here a pay per view event which requires viewer acknowledgment 604. The viewer may either confirm ("Yes") or cancel ("No") the reminder. In this example, if the viewer confirms 417 the reminder, then the broadcast receiver 120 automatically tunes 410 to the channel associated with the broadcast event, using the information in the event description. Further, since this is a pay-per-view event, the execution engine 217 automatically initiates the necessary functions to purchase the pay-per-view event, such as storing the necessary viewer billing information in memory 213 for uploading to the broadcast system for billing purposes. Mechanisms for purchasing pay-per-view events are well known to those of skill in the art. For broadcast events that do not require a purchase, the execution engine 217 need only tune to the channel defined for the broadcast event. If the viewer cancels 415 the reminder (i.e. "No"), then the execution engine 217 takes no further action, and does not tune to the channel for the broadcast event.

Figure 7:
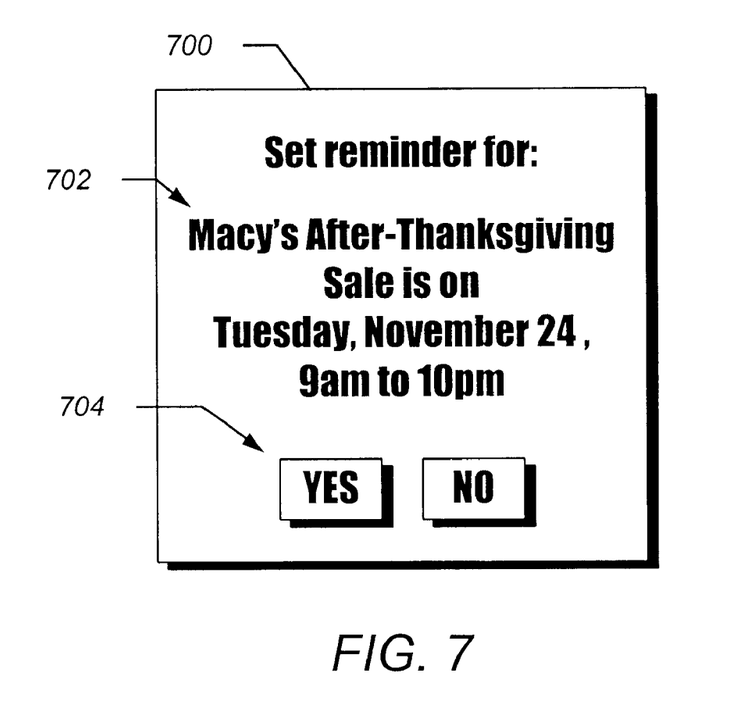
FIG. 7 is an illustration of a reminder confirmation display for a non-broadcast event.

Reminders for non-broadcast events are similar to reminders for broadcast events. FIG. 7 illustrates an exemplary reminder confirmation form 700 for a non-broadcast event, in this example a sale at a local retail store. This form 700 would be displayed 406 concurrently with the display of a commercial advertisement. Here, the event description 702 stored in memory 213 would include the event name "Macy's After-Thanksgiving Sale" and date/time data for the start of the event. For multiple reminders, the reminder data may include data to set future times for reminders 3, 2, and 1 day in advance of the event, or other desirable schedule. Again, the user can either confirm or cancel the reminder. A reminder display form for a non-broadcast event would be similar to the form shown in FIG. 6, but with the appropriate content. A reminder display form for a non-broadcast event is displayed to the viewer, either for a predetermined amount of time (413), or preferably until the viewer confirms 417 the display or cancels 415. If a timeout 413 occurs, then the BR 120 returns to scanning 400 for the next interactive application.

In an embodiment with multiple reminders for a given event, a series of reminders includes a number of non-terminal reminders followed by a last, terminal reminder. In this embodiment, after each non-terminal reminder is displayed 406 to the viewer and confirmed 419, the execution engine 217 resets 408 a timer for the future time for displaying the next reminder. In this fashion, the series of reminders are appropriately displayed to the viewer. Each of these reminders may have its own event description to provide a logical handling of viewer inputs. For example, non-terminal reminders may allow the viewer to confirm the next reminder or cancel the series of reminders. In the latter case, the execution engine 217 removes the reminder data for this reminder from memory 213. If the viewer does not cancel or confirm the reminder before a timeout 421, then the timer for the next reminder is automatically set 408.

In summary, the present invention provides a system, method, and various software based products to allow an interactive broadcast system to be used for establishing reminders for both broadcast and non-broadcast events. Because the reminders are established concurrently while viewing a broadcast program related to the desired future event or reminder, the viewer does not have to access and traverse a separate program guide to establish a reminder. In addition, this allows the viewer to set reminders for non-broadcast events which do not appear in conventional program guides.

We claim:

1. A computer implemented method of operating a broadcast receiver for establishing reminders for events related to broadcast programs, the broadcast receiver including a local memory, the method comprising:

receiving at the broadcast receiver broadcast data including at least one broadcast program and separate reminder data associated with the broadcast program;

displaying the broadcast program on a display device coupled to the broadcast receiver;

during the display of the broadcast program, and without requiring a previous display of a program listing, receiving a user input to establish a reminder for an event related to the broadcast program;

storing in the local memory of the broadcast receiver the reminder data for the event, including data for determining a future time to display the reminder, and a description of the event, the reminder data stored in the local memory until the future time;

determining in the broadcast receiver from the locally stored reminder data whether to display the reminder at the future time; and responsive to the future time, displaying on the display device the reminder including the description of the event.

2. The method of claim 1, further comprising:

receiving a broadcast program on a first channel indicating a broadcast event occurring at a future time on a second channel;

receiving, while tuning to the first channel, a user input to establish a reminder for the broadcast event occurring at the future time on the second channel; and storing the reminder for the broadcast event in the memory of the broadcast receiver.

3. The method of claim 1, wherein determining in the broadcast receiver from the locally stored reminder data whether to display the reminder at the future time comprises:

executing in the broadcast receiver a timer that expires at the future time.

4. The method of claim 1, further comprising:

tuning to first channel, and displaying a first broadcast program on the first channel;

displaying a reminder for a second broadcast program occurring on a second channel different from the first channel; and tuning to the second channel, and displaying the second broadcast program.

5. The method of claim 4, further comprising:

storing data indicative of a purchase of the second broadcast program.

6. The method of claim 1, further comprising:

periodically displaying a subsequent reminder of the broadcast program.

7. A computer implemented method of operating a broadcast receiver for establishing reminders for events related to broadcast programs, the broadcast receiver including a local memory, the method comprising:

receiving at the broadcast receiver broadcast data including at least one broadcast program and a reminder interactive application associated with the broadcast program;

displaying the broadcast program on a display device coupled to the broadcast receiver;

concurrently with displaying the broadcast program, and without requiring a previous display of a program listing receiving a user input activating the reminder interactive application to establish a reminder for a future broadcast of the broadcast program;

storing in the local memory of the broadcast receiver reminder data for the future broadcast, including data for determining a future time to display the reminder and a description of the future broadcast, the reminder data stored in the local memory until the future time;

determining in the broadcast receiver whether the future time for displaying the reminder has occurred; and responsive to the future time occurring, retrieving the reminder data from the local memory and displaying the reminder on the display device using the description of the future broadcast included in the retrieved reminder data.

8. The method of claim 7, further comprising:

storing a reminder form in the local memory; and displaying the reminder including the description of the event further comprises:

combining the reminder form and the description of the event to create the reminder.

9. The method of claim 7, wherein determining in the broadcast receiver whether the future time for displaying the reminder has occurred comprises:

maintaining in the broadcast receiver a timer that expires at the future time.

10. The broadcast receiver of claim 9, wherein:

the broadcast data includes an executable reminder interactive application that contains the reminder data;

the processor executes the reminder interactive application to receive the user input requesting establishment of the reminder for the event, stores the reminder data contained in the reminder interactive application in the memory, and executes a timer to expire at the future time.

11. A broadcast receiver for establishing and communicating reminders of events related to broadcast programs, the broadcast receiver comprising:

a tuner for receiving broadcast data including at least one broadcast program and reminder data for an event associated with the broadcast program, the reminder data including data for determining a future time to display a reminder of the event, and a description of the event;

a memory coupled to the tuner to receive and store the reminder data until at least the future time in response to a user input requesting establishment of the reminder for the event, the user input received during the display of the broadcast program and without requiring a previous display of a program listing; and a processor coupled to the memory to receive the reminder data and programmed to determine from the reminder data stored in the memory whether to display the reminder the future time, and responsive to determination, to generate the reminder from the reminder data, the reminder including the event description, the processor outputting the reminder for display on a display device locally coupled to the broadcast receiver.

12. The broadcast receiver of claim 11, wherein:

the broadcast data includes an executable reminder interactive application that contains the reminder data;

the processor executes the reminder interactive application to receive the user input requesting establishment of the reminder for the event, stores the reminder data contained in the reminder interactive application in the memory, and executes a timer to expire at the future time.

13. A computer implemented method of operating a broadcast receiver for establishing reminders for non-broadcast events related to broadcast programs, the broadcast receiver including a local memory, the method comprising;

receiving at the broadcast receiver an advertisement of a non-broadcast event, the non-broadcast event occurring independently of the broadcast program;

displaying the advertisement on a display device coupled to the broadcast receiver;

during the display of the advertisement and without requiring a previous display of a program listing, receiving a user input to establish a reminder for the non-broadcast event;

storing in the local memory of the broadcast receiver reminder data for the non-broadcast event, including data for determining a future time to display the reminder, and a description of the non-broadcast event, the reminder data stored in the local memory until the future time;

determining in the broadcast receiver from the locally stored reminder data whether the future time has occurred; and responsive to the future time occurring, displaying on the display device the reminder including the description of the non-broadcast event.

14. A computer implemented method of operating a broadcast receiver for establishing reminders for broadcast programs, the broadcast receiver including a local memory, the method comprising:

receiving at the broadcast receiver a broadcast program;

displaying the broadcast program on a display device coupled to the broadcast receiver;

during the display of the broadcast program and without requiring a previous display of a program listing, receiving a user input to establish a reminder for a future broadcast of the broadcast program;

storing in the local memory of the broadcast receiver reminder data for the future broadcast, including data for determining a future time to display the reminder, and a description of the future broadcast, the reminder data stored in the local memory until the future time;

determining in the broadcast receiver whether the future time has occurred; and responsive to the future time occurring, displaying on the display device the reminder including the description of the future broadcast.

15. A computer implemented method of operating a broadcast receiver for establishing reminders for broadcast programs, the broadcast receiver including a local memory, the method comprising:

receiving a commercial on a first channel for a future broadcast of a broadcast program occurring at a future time on a second channel;

displaying the commercial on a display device coupled to the broadcast receiver;

receiving during the display of the commercial and without requiring a previous display of a program listing, a user input to establish a reminder for the future broadcast of the broadcast program;

storing in the local memory of the broadcast receiver reminder data for the future broadcast of the broadcast program, including data for determining a future time to display the reminder, a name of the broadcast program, and the second channel, the reminder data stored in the local memory until the future time;

determining in the broadcast receiver whether the future time has occurred; and responsive to the future time occurring, displaying on the display device the reminder including the name of the broadcast program, and the second channel on which the broadcast program will be broadcast.

16. The method of claim 15, wherein receiving a user input to establish a reminder further comprises:

receiving a user confirmation of the reminder via a form displayed on the display device.

17. The method of claim 15, further comprising:

responsive to a user confirmation of the reminder, tuning the broadcast receiver to the second channel.

18. The method of claim 17, further comprising:

storing billing information for billing the user for receiving the broadcast program on the second channel.

19. A computer implemented method of operating a broadcast receiver for establishing reminders for a future broadcast of a broadcast program, the broadcast receiver including a local memory, the method comprising:

while displaying the broadcast program on a display device coupled to the broadcast receiver, and without requiring a previous display of a program listing on the display device, receiving a user input to establish a reminder for the future broadcast of the broadcast program;

responsive to the user input, storing in the local memory of the broadcast receiver reminder data, including data for determining a future time to display the reminder, and a description of the broadcast program; and responsive to the future time occurring, displaying on the display device the reminder including the description of the broadcast program.

20. The method of claim 19, wherein receiving a user input to establish a reminder further comprises:

receiving a user confirmation of the reminder via a form displayed on the display device.

21. The method of claim 20, further comprising:

responsive to a user confirmation of the reminder, tuning the broadcast receiver to a second channel to view the future broadcast.

22. The method of claim 21, further comprising:

storing billing information for billing the user for receiving the broadcast program on the second channel.

23. The method of claim 19, further comprising:

periodically displaying a subsequent reminder of the future broadcast of the broadcast program.

24. The method of claim 19, further comprising:

determining in the broadcast receiver from the locally stored reminder data whether the future time for displaying the reminder has occurred.

25. The method of claim 24, wherein determining in the broadcast receiver from the locally stored reminder data whether the future time for displaying the reminder has occurred further comprises:

executing in the broadcast receiver a timer that expires at the future time.

26. The method of claim 19, further comprising:

storing a reminder form in the local memory; and displaying on the display device the reminder including the description of the broadcast program, further comprises:

combining the reminder form and the description of the event to create the reminder.

* * * * *

UNITED STATES PATENT AND TRADEMARK OFFICE
CERTIFICATE OF CORRECTION

PATENT NO. : 6,725,461 B1
DATED : April 20, 2004
INVENTOR(S) : Brian P. Dougherty, Allan C. Thygesen and Michael Capuano It is certified that error appears in the above-identified patent and that said Letters Patent is hereby corrected as shown below:

<u>Column 14,</u>
Line 15, cancel claim 10, and insert the following:
-- 10. The method of claim 9, wherein the future time occurs upon expiration of the timer. --

Signed and Sealed this

Thirteenth Day of July, 2004

JON W. DUDAS
*Acting Director of the United States Patent and Trademark Office*